(12) United States Patent
Murray

(10) Patent No.: US 6,907,443 B2
(45) Date of Patent: *Jun. 14, 2005

(54) MAGNITUDE COMPARATOR

(75) Inventor: Daniel C. Murray, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 09/956,399

(22) Filed: Sep. 19, 2001

(65) Prior Publication Data

US 2003/0061539 A1 Mar. 27, 2003

(51) Int. Cl.[7] ............................................... G06F 7/50
(52) U.S. Cl. ..................................... 708/671; 340/146.2
(58) Field of Search .................................. 708/207, 201, 708/202, 671; 340/146.2

(56) References Cited

U.S. PATENT DOCUMENTS

| | | | |
|---|---|---|---|
| 5,281,946 A | * 1/1994 | Van Le | ..................... 340/146.2 |
| 5,539,332 A | 7/1996 | Schmookler | |
| 5,592,142 A | * 1/1997 | Adams et al. | ........... 340/146.2 |
| 5,689,228 A | 11/1997 | Yetter et al. | |
| 5,781,465 A | * 7/1998 | Lutz et al. | ................... 708/671 |
| 5,944,771 A | * 8/1999 | Shiraishi | ..................... 708/201 |
| 6,216,147 B1 | 4/2001 | Petro et al. | |

OTHER PUBLICATIONS

SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB–1 CPU, Oct. 2000, rev. 0.1, 1 page.
SiByte, "Fact Sheet," SB–1250, Oct. 2000, rev. 0.2, 10 pages.
Stepanian, SiByte, SiByte SB–1 MIPS64 CPU Core, Embedded Processor Forum 2000, Jun. 13, 2000, 15 pages.
Jim Keller, "The Mercurian Processor: A High Performance, Power–Efficient CMP for Networking," Oct. 10, 2000, 22 pages.
Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.
SiByte, Letter from Anu Sundaresan, May 18, 2000, 1 page.

* cited by examiner

*Primary Examiner*—Chuong Dinh Ngo
(74) *Attorney, Agent, or Firm*—Garlick Harrison & Markison LLP

(57) ABSTRACT

A magnitude comparator circuit may include a first circuit coupled to receive the operands to be compared, a second circuit coupled to the first circuit, and a third circuit coupled to the second circuit and coupled to receive a first operand of the operands to be compared. The first circuit is configured to generate a vector indicative of whether or not bits in the first operand and the second operand are equal. The second circuit receives the vector, and generates an indication of the first bit, beginning with the most significant bit, at which the first operand and the second operand differ. The third circuit receives the indication, and generates an indication of whether or not the first operand is greater than the second operand. In one embodiment, the first, second, and third circuits are included in a combined magnitude compare/count leading zero circuit.

24 Claims, 5 Drawing Sheets

| | |
|---|---|
| SRCA[7:0] | 0010 1100 |
| SRCB[7:0] | 0000 0100 |
| Compare_Vector[7:0] | 0010 1000 |
| OR_Vector[7:0] | 0011 1111 |
| One_Hot[7:0] | 0010 0000 |
| A_Gt_B | 1 |

*Fig. 3*

| | |
|---|---|
| SRCA[7:0] | 0010 1100 |
| SRCB[7:0] | 0100 0100 |
| Compare_Vector[7:0] | 0110 1000 |
| OR_Vector[7:0] | 0111 1111 |
| One_Hot[7:0] | 0100 0000 |
| A_Gt_B | 0 |

*Fig. 4*

MAGNITUDE COMPARATOR

BACKGROUND OF THE INVENTION

1. Field of the Invention

This invention is related to the field of processors and, more particularly, to magnitude comparators in processors.

2. Description of the Related Art

Processors often are designed to perform a magnitude comparison of a pair of operands. As used herein, a magnitude comparison is a comparison which determines the relative magnitude of the operands (e.g. one operand being greater than or less than the other operand). The result of the comparison is a value which indicates the relative magnitude. For example, the result may indicate whether or not a first operand is greater than a second operand. Alternatively, the result may indicate whether or not the first operand is less than the second operand, greater than or equal to the first operand, less than or equal to the second operand, any combination of the above, etc.

Magnitude comparisons may be during execution of a variety of instructions. For example, a magnitude comparison may be used in some instruction sets when executing a conditional branch instruction, comparing two operands of the branch instruction and conditionally taking or not taking the branch in response to the result of the magnitude comparison. Some instruction sets include instructions which conditionally cause an exception (e.g. the trap instructions in the MIPS instruction set) based on a magnitude comparison of two operands of the instruction. Other instructions may be defined to write a register with a binary one or zero based on the result of the comparison of two operands of such instructions. For example, the MIPS instruction set includes set instructions which are defined to write a general purpose register with the result of a magnitude comparison. Another example of such instructions may be compare instructions included in many instruction sets. Compare instructions may write any register with a result (or multiple bits of results, such as greater than, less than, equal, etc.). Often, compare instructions update a special condition code (or flags) register with multiple bits of result based on a magnitude comparison.

Typically, magnitude comparisons are performed in processors using a full adder to subtract a first of the two operands to be compared from the second of the two operands. The sign of the result of the subtraction indicates whether or not the first operand is greater than the second operand.

SUMMARY OF THE INVENTION

A magnitude comparator circuit may include a first circuit coupled to receive the operands to be compared, a second circuit coupled to the first circuit, and a third circuit coupled to the second circuit and coupled to receive a first operand of the operands to be compared. The first circuit is configured to generate a vector indicative of whether or not bits in the first operand and the second operand are equal. The second circuit receives the vector, and generates an indication of the first bit, beginning with the most significant bit, at which the first operand and the second operand differ. The third circuit receives the indication, and generates an indication of whether or not the first operand is greater than the second operand. For example, in one embodiment, the third circuit may select the first bit from the first operand to generate the output.

In one embodiment, the first, second, and third circuits are included in a combined magnitude compare/count leading zero circuit. A selection circuit may select between the vector from the first circuit and an operand on which to perform a count leading zero operation (or a count leading one operation). The second circuit may receive the output of the selection circuit. The indication from the second circuit may also be provided to an encoder which encodes a leading zero (or leading one) count from the indication.

BRIEF DESCRIPTION OF THE DRAWINGS

The following detailed description makes reference to the accompanying drawings, which are now briefly described.

FIG. 3 is an example of magnitude comparison.

FIG. 4 is a second example of magnitude comparison.

Figure 1:
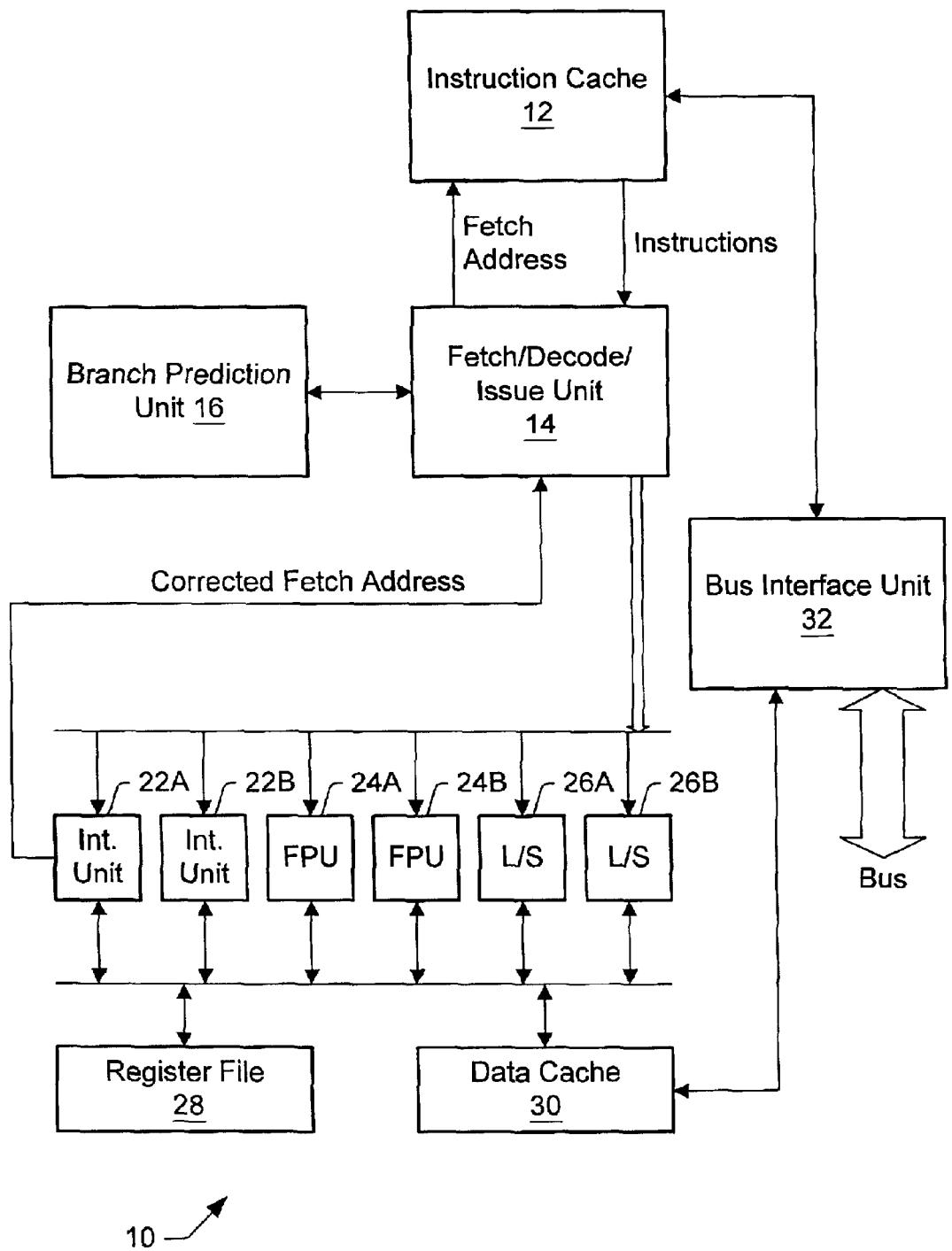
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch prediction unit 16, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A–22B, 24A–24B, and 26A–26B. Specifically, the fetch/decode/issue unit 14 is coupled to provide a branch address to the branch prediction unit 16 and to receive a prediction and/or a target address from the branch prediction unit 16. The fetch/decode/issue unit 14 is coupled to provide instructions for execution to the execution units 22A–22B, 24A–24B, and 26A–26B and to receive a corrected fetch address from the integer execution unit 22A. The execution units 22A–22B, 24A–24B, and 26A–26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4 k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more instruction queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units, and two load/store units, other embodiments may employ any number of each type of unit, and the number of one type may differ from the number of another type.

Magnitude Comparator

Figure 2:
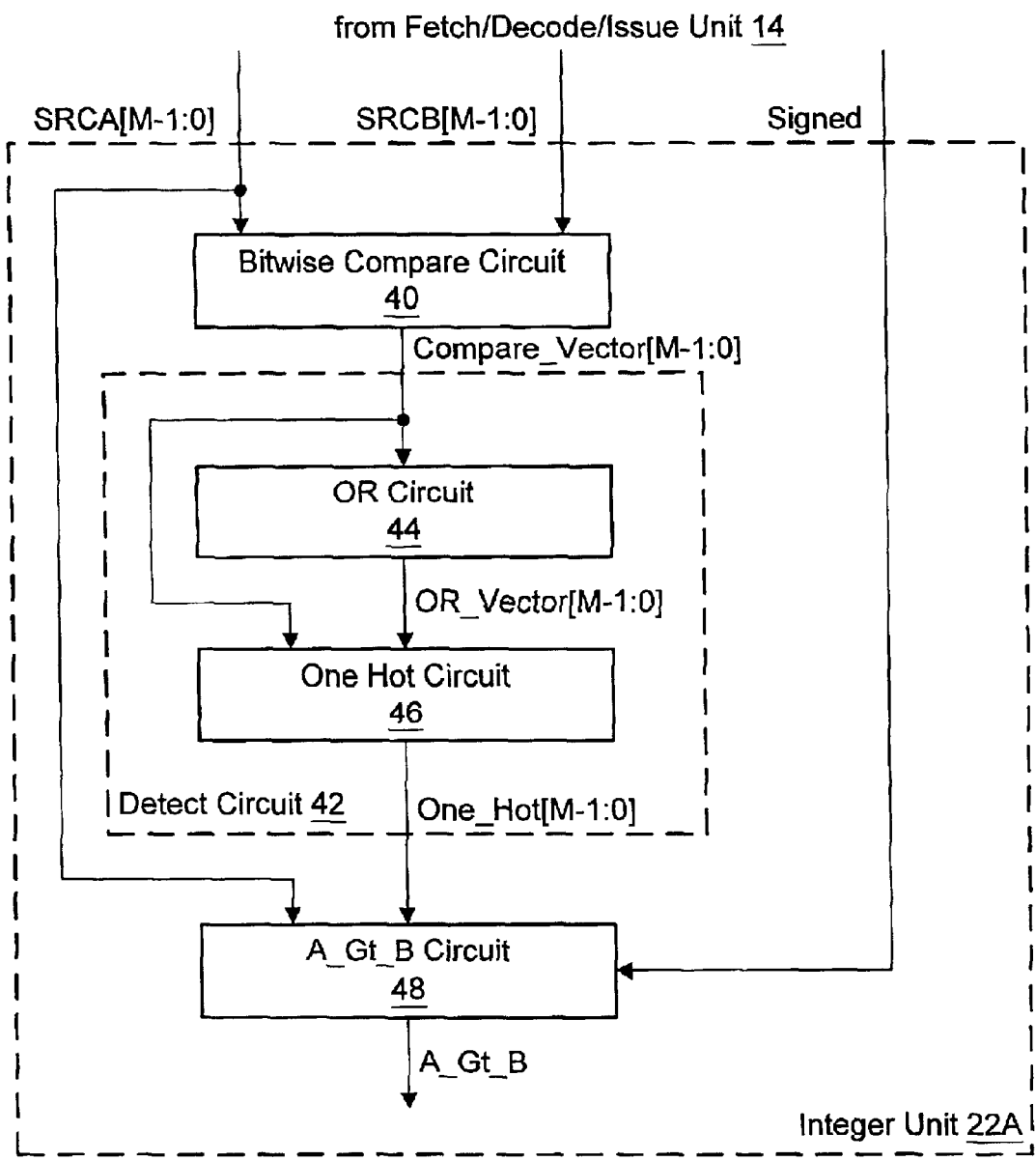
FIG. 2 is a block diagram of a portion of one embodiment of an integer unit including a magnitude comparator.

Turning next to FIG. 2, a block diagram of one embodiment of a portion of the integer unit 22A is shown. Particularly, the portion shown in FIG. 2 may comprise a magnitude comparator circuit included in the integer unit 22A. Other portions (not shown) may include circuitry for performing other integer operations. The integer unit 22B may include a similar magnitude comparator. Other embodiments are possible and contemplated. In the embodiment of FIG. 2, the magnitude comparator includes a bitwise compare circuit 40, a detect circuit 42 including two subcircuits (an OR circuit 44 and a one hot circuit 46), and an A_Gt_B circuit 48. The integer unit 22A is coupled to receive at least two M-bit operands (SRCA[M–1:0] and SRCB[M–1:0]) of the instruction to be executed, and a signed signal indicating whether the operation is a signed integer operation or an unsigned integer operation. The bitwise compare circuit 40 is coupled to receive the operands and to generate a vector (Compare_Vector[M–1:0]). The detect circuit 42 (and more particularly the OR circuit 44 and the one hot circuit 46) is coupled to receive the Compare_Vector[M–1:0]. The OR circuit 44 is configured to generate a second vector (OR_Vector[M–1:0]). The one hot circuit 46 is coupled to receive the OR_Vector[M–1:0] and the Compare_Vector[M–1:0] and generates an output vector (One_Hot[M–1:0]). The A_Gt_B circuit 48 is coupled to receive the One_Hot[M–1:0] vector, the SRCA[M–1:0] operand, and the signed signal. The A_Gt_B circuit 48 generates an A_Gt_B signal in response to its inputs. The A_Gt_B signal may be output by the integer unit 22A, or may be provided to other circuitry in the integer unit 22A which selects the output based on the instruction being executed.

Generally, the magnitude comparator is configured to compare the two source operands SRCA and SRCB and to produce an output indicative of the relative magnitude. For example, in the illustrated embodiment, the magnitude comparator generates an output indicating whether or not the SRCA operand is greater than the SRCB operand. Other embodiments may generate an output indicating whether or not the SRCA operand is less than the SRCB operand, or multiple outputs indicating the relative magnitude of the SRCA and SRCB operands, using similar circuitry to that illustrated in FIG. 2.

Comparing the magnitude of two integer numbers may generally involve finding the first bit, beginning with the most significant bit and progressing to the least significant bit in order, at which the two integer numbers differ. The number having a binary one in the first bit (assuming the numbers are unsigned or signed but have the same sign) is greater than the other number. The magnitude comparator illustrated in FIG. 2 accomplishes the magnitude compare by performing a bitwise compare of the two integers to produce a compare vector (Compare_Vector[M−1:0]), detects the first bit (beginning with the most significant bit and proceeding in order to the least significant bit) of the compare vector which indicates that the corresponding bits differ (are not equal), and selects the first bit of one of the operands as the result of the comparison.

In the illustrated embodiment, the bitwise compare circuit 40 performs a bitwise compare of the SRCA and SRCB operands to produce the compare vector Compare_Vector [M−1:0]. Each bit of the compare vector is the comparison result for the like-numbered bits of the SRCA and SRCB operands. The compare vector is thus a vector of bits indicating whether or not the corresponding bits of the SRCA and SRCB operands are equal. The compare vector is provided to the detect circuit 42, which generates an indication of the most significant bit in which the SRCA and SRCB operands are not equal. Particularly, in the illustrated embodiment, the indication is a one hot vector (One_Hot [M−1:0]) having its set bit at the bit location of the most significant bit in which the SRCA and SRCB operands differ. The A_Gt_B circuit 48 receives the one hot vector and the SRCA operand, and generates the A_Gt_B output signal. In particular, the A_Gt_B circuit 48 may select the bit of the SRCA operand indicated by the one hot vector. If the bit is set, then SRCA is greater than SRCB. If the bit is clear, then SRCA may be less than SRCB or equal to SRCB.

In one embodiment, the bitwise compare circuit 40 performs a bitwise exclusive OR (XOR) of the SRCA and SRCB operands. Since an XOR of two bits is a logical zero if the bits are the same and a logical one if the bits differ, the resulting compare vector includes set bits in bit locations in which the SRCA and SRCB operands differ, and clear bits in bit locations in which the SRCA and SRCB operands are equal.

For this embodiment, the detect circuit 42 includes an OR circuit 44 and a one hot circuit 46. The OR circuit 44 receives the compare vector and produces an OR vector output (OR_Vector[M−1:0]). Each bit of the OR vector is a logical OR of the corresponding bit of the compare vector and each more significant bit of the compare vector. Thus, OR_Vector[M−1] is equal to Compare_Vector[M−1]; OR_Vector[M−2] is equal to Compare_Vector[M−1] OR Compare_Vector[M−2]; OR_Vector[M−3] is equal to Compare_Vector[M−1] OR Compare_Vector[M−2] OR Compare_Vector[M−3]; etc. Accordingly, the OR vector is a vector comprising binary zeros from the most significant bit to the first bit of the compare vector which is set, and binary ones for the remaining bits. The transition in the OR vector from a binary zero to a binary one identifies the first bit in the source operands which differ. The following Verilog code may represent the circuitry of the OR circuit 44:

```
OR_Vector[M−1] = Compare_Vector[M−1];
for (bit=M−2; bit >=0; bit−−) {
    OR_Vector[bit] = OR_Vector[bit+1] | Compare_Vector[bit];
}
```

The OR circuit 44 may comprise a set of cascaded OR gates, each OR gate receiving the output of the previous OR gate and a bit of the Compare_Vector (as implied by the above Verilog code). Alternatively, the OR circuit 44 may comprise individual OR gates for each bit position, each OR gate receiving the compare vector bit corresponding to its bit position and each more significant bit of the compare vector and logically ORing those bits to produce the corresponding OR vector bit. The OR circuit 44 may be realized using standard complementary metal-oxide-semiconductor (CMOS) logic gate circuits, or any other type of logic gate circuits, as desired. For the wider OR gates, domino dynamic circuits or pseudo NMOS circuits (in which a weak PMOS pullup is coupled to an output node and has its gate terminal grounded, and NMOS pulldowns receive the input bits on their respective gate terminals and are coupled to the output node) may be used in some embodiments.

The one hot circuit 46 re-encodes the OR vector as a one hot vector (One_Hot[M−1:0]). In one embodiment, the one hot circuit 46 performs the re-encoding by logically ANDing each bit of the compare vector with the inverse of the next most significant bit of the OR vector. For example, if the first difference (beginning at the most significant bit) between corresponding bits of the SRCA and SRCB operands is at bit N, then: (i) bits M−1 to N+1 of both the OR vector and the compare vector are zero; (ii) bit N of both the OR vector and the compare vector are one; and (iii) bits N to zero of the OR vector are binary one. Thus, the logical AND of the compare vector and the inverse of the next most significant bit of the OR vector results in zero for bits M−1 to N+1 (since the compare vector is zero for these bits). The logical AND of bit N of the compare vector (which is a logical one) and the inverse of bit N+1 of the OR vector (which is a binary zero, and thus the inverse is a binary one) is a one. The logical AND of the compare vector and the inverse of the next most significant bit of the OR vector for bits N−1 to zero is a binary zero since the OR vector bits are ones, and thus the inverse are binary zeros. The following Verilog code may represent the circuitry of one embodiment of the one hot circuit 46:

One_Hot[M−1]=OR_Vector[M−1];
One_Hot[M−2:0]=~OR_Vector[M−1:1] & Compare_Vector[M−2:0];

The one hot circuit 46 may be realized using standard CMOS logic gate circuits, or any other logic gate circuits, as desired.

As mentioned above, the A_Gt_B circuit 48 may use the one hot vector to select the bit identified by the one hot vector from the SRCA operand as the output of the A_Gt_B circuit 48. Since the operands are known to differ in the identified bit, if the identified bit is a one in the SRCA operand, then the SRCA operand is greater than the SRCB operand. If the identified bit is a zero in the SRCA operand, then the SRCA operand is less than the SRCB operand. In one embodiment, the A_Gt_B circuit 48 may perform a bitwise logical AND of the SRCA operand and the one hot vector, and may OR the resulting bits to select the identified bit from the SRCA operand.

The above description of the magnitude comparator handles both unsigned integer numbers and signed integer numbers if the sign is the same. Such an embodiment may be used if unsigned comparisons are to be performed. A number is "unsigned" if the bits forming the number are interpreted as a positive number (no bits are used to indicate the sign of the number). A number is "signed" if one or more of the bits may indicate the sign of the number. For example, two's complement integer representations are often used in which the most significant bit of each integer number is the sign of the number (zero if positive, one if negative).

For embodiments handling both signed and unsigned numbers, the signed input signal is used. Generally, the signed input signal may be generated by decoding the instruction being executed by the integer unit 22A. Some instructions may be defined to perform unsigned magnitude comparisons, while other instructions may be defined to perform signed comparisons. As mentioned above, the above described circuitry correctly indicates whether or not SRCA is greater than SRCB if the numbers are unsigned or if the sign is the same. If the sign differs, then the bitwise comparison indicates a difference between the most significant bits of the operands. Also, the operand which is positive (most significant bit is zero) is the greater number. Accordingly, if the signed signal is asserted, the most significant bit of the SRCA operand is inverted prior to performing the logical AND in the A_Gt_B circuit 48. In this fashion, the correct greater than or not greater than result may be selected. The following Verilog code may represent the circuitry of the A_Gt_B circuit 48:

Temp[M–1]=One_Hot[M–1] & (signed ?~SRCA[M–1]
:SRCA[M–1]);
Temp[M–2:0]=One_Hot[M–2:0]& SRCA[M–2:0];
A_Gt_B=|Temp;

The A_Gt_B circuit 48 may be realized using standard CMOS logic gate circuits, or any other logic gate circuits, as desired. For the wider OR gates, domino dynamic circuits or pseudo NMOS circuits may be used in some embodiments.

While the above described embodiment uses an XOR compare circuit 40 and an OR circuit 44, other embodiments may use other circuits. For example, an embodiment including an exclusive NOR (XNOR) compare circuit 40 and a NAND circuit 44 is contemplated. In such an embodiment, the compare vector includes set bits to indicate corresponding bits of the SRCA and SRCB operands are equal and clear bits to indicate the corresponding bits are not equal. Generally, any circuit which performs a bitwise compare may be used as the bitwise compare circuit 40. Furthermore, the circuit 44 may perform different logical operations on the compare vector.

It is noted that, rather than using a one hot vector for selecting a bit of the SRCA operand, any other indication may be used. For example, the indication could be a multiplexor select signal for muxing out the identified bit of the SRCA operand. Still further, other embodiments may generate each bit of the one hot vector by logically ANDing the corresponding bit of the OR vector and the inverse of the next most significant bit of the OR vector. Other embodiments may also select the identified bit from the SRCB operand (thereby producing a B_Gt_A output signal). Additionally, other embodiments may employ any Boolean equivalents of the any of the above described embodiments.

It is noted that the above description refers to operation on M bit operands. M may be any integer value greater than zero. For example, in some embodiments, M may be 8, 16, 32, 64, 128, etc. In one embodiment, M is 64.

It is noted that, for the above embodiment in which an A_Gt_B signal is generated, the magnitude comparator indicates whether or not the SRCA operand is greater than the SRCB operand (i.e. if the A_Gt_B signal is asserted the SRCA operand is greater than the SRCB operand and if the A_GT_B signal is deasserted the SRCA operand is not greater than the SRCB operand). If the SRCA operand is not greater than the SRCB operand, the SRCA operand is either less than or equal to the SRCB operand. If the less than and equal cases are to be distinguished from each other, several embodiments are contemplated. In one embodiment, an equality compare circuit may also receive the SRCA and SRCB operand and assert an equal signal if the SRCA and SRCB operands are equal, to distinguish the less than and equal cases. Alternatively, an additional bit may be included in the compare vector (to the right of the least significant bit) to each operand. The additional bit may be forced to a one for one of the operands and zero for the other operand. The additional bit may flow through the circuitry to the A_Gt_B circuit 48 in the same fashion as the other bits. If the least significant bit (corresponding to the additional bit) of the one hot vector is a one, then the operands are equal. The least significant bit may be provided as an "equal" output of the A_Gt_B circuit 48. The remaining bits of the one hot vector may be treated as described above to generate the A_Gt_B signal. In yet another alternative, the compare vector bits may be logically NORed to detect the equal case.

As used herein, a bitwise operation is an operation performed on corresponding bits of two or more input values to produce a bit of the output. For example, the operation performed on bit 0 of the input values produces bit 0 of the output; the operation performed on bit 1 of the input values produces bit 1 of the output; etc. As used herein, a one hot vector is a vector which includes at most one set bit, and each other bit is cleared.

It is noted that the SRCA and SRCB operands may generally be operands specified by the instruction being executed. The operands may be any combination of register operands stored in an architected register (e.g. a general purpose register), immediate operands forming part of the instructions, memory operands stored in a memory location addressed using address operands of the instruction, etc.

In some embodiments, the magnitude comparator as illustrated in FIG. 2 may occupy less circuit area than a full adder circuit. Additionally, in some embodiments, the magnitude comparator may more rapidly compute a result than would a full adder circuit.

Turning next to FIGS. 3 and 4, examples of the operation of one embodiment of the magnitude comparator shown in FIG. 2 are provided. Both examples are assumed to be unsigned integers. For the examples, 8 is selected as the value of M for convenience, but any value of M may be used. For the examples, the bitwise compare circuit 40 performs an XOR and the circuit 44 performs an OR function.

In the example of FIG. 3, the SRCA operand is greater than the SRCB operand. The first bit (beginning at the most significant bit) which differs between the SRCA and SRCB operands is bit 5, which is a binary one in the SRCA operand and a binary zero in the SRCB operand. The compare vector has binary ones in bit 5 and also in bit 3, where the SRCA and SRCB operands also differ. The OR vector has one bits from bit 5 to bit 0, as described above, and the one hot vector has its set bit as bit 5. Selecting bit 5 of the SRCA operand results in the A_Gt_B signal being a binary one (asserted for this embodiment, although other embodiments may define a signal as asserted at a binary zero).

In the example of FIG. 4, the SRCB operand is greater than the SRCA operand. The first bit (beginning at the most significant bit) which differs between the SRCA and SRCB operands is bit 6, which is a binary zero in the SRCA operand and a binary one in the SRCB operand. The compare vector has binary ones in bit 6 and also in bits 5 and 3, where the SRCA and SRCB operands also differ. The OR vector has one bits from bit 6 to bit 0, as described above, and the one hot vector has its set bit as bit 6. Selecting bit 6 of the SRCA operand results in the A_Gt_B signal being a binary zero (deasserted for this embodiment).

Figure 5:
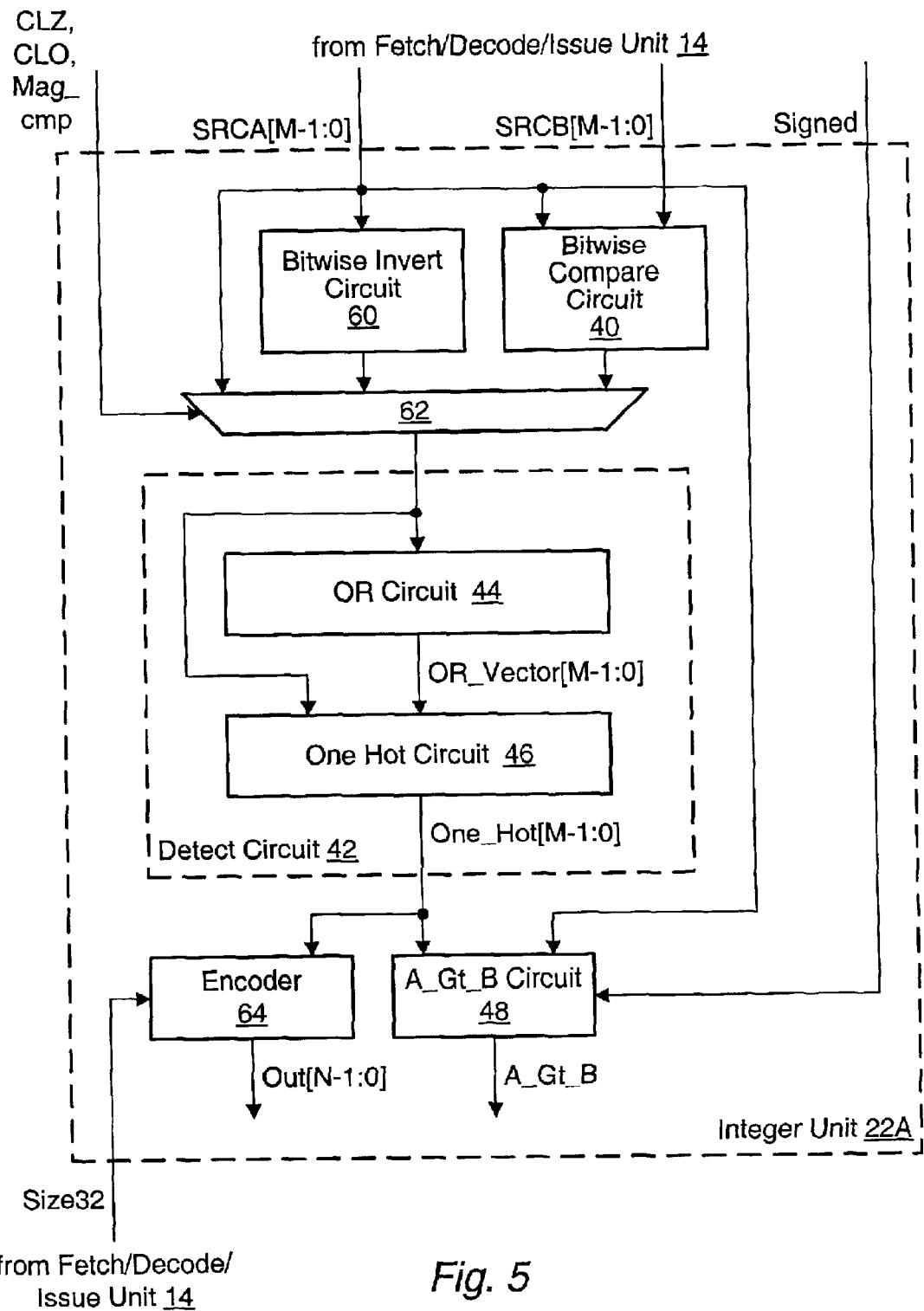
FIG. 5 is a block diagram of a portion of an integer unit including a combined count leading zero circuit/magnitude comparator.

Turning next to FIG. 5, a block diagram of a second embodiment of the integer unit 22A is shown. Other embodiments are possible and contemplated. In the embodiment of FIG. 5, the magnitude comparator is included in a combined magnitude compare/count leading zero circuit. The combined circuit may share certain circuitry between the magnitude comparator and the count leading zero circuitry. The illustrated embodiment includes the bitwise compare circuit 40, the detect circuit 42 (including the OR circuit 44 and the one hot circuit 46), and the A_Gt_B circuit 48 similar to the embodiment of FIG. 2. Additionally, the illustrated embodiment includes a bitwise invert circuit 60, a multiplexor (mux) 62, and an encoder 64. The integer unit 22A is coupled to receive at least SRCA and SRCB operands of the instruction to be executed, a signed signal indicating whether or not the operation is a signed integer operation, a selection control for the mux 62, and a size32 signal described in more detail below. The bitwise compare circuit 40 is coupled to receive the operands and to generate a vector input to the mux 62. The mux 62 is further coupled to receive the SRCA operand, and the output of the bitwise inversion circuit 60. The bitwise invert circuit 60 is coupled to receive the SRCA operand as well. The output of the mux 62 is provided to the detect circuit 42 (and more particularly the OR circuit 44 and the one hot circuit 46). The OR circuit 44 is configured to generate a second vector (OR_Vector [M−1:0]). The one hot circuit 46 is coupled to receive the OR_Vector[M−1:0] and the Compare_Vector[M−1:0] and generates an output vector (One_Hot[M−1:0]). The A_Gt_B circuit 48 is coupled to receive the One_Hot[M−1:0] vector, the SRCA[M−1:0] operand, and the signed signal and generates an A_Gt_B signal in response thereto. Furthermore, the encoder is coupled to receive the One_Hot[M−1:0] vector and the size32 signal, and is configured to provide an output Out[N−1:0]. The A_Gt_B signal and/or the Out[N−1:0] output may be output by the integer unit 22A, or may be provided to other circuitry in the integer unit 22A which selects the output based on the instruction being executed.

The circuitry illustrated in FIG. 5 may perform the magnitude comparison described above, or may perform a count leading zero or count leading one operation, depending on the input selected by the mux 62. If a magnitude comparison is indicated on the selection input, the mux 62 selects the output of the bitwise compare circuit 40 as the output of the mux 62. In this case, the combined magnitude comparator/count leading zero circuit may function as described above with respect to FIG. 2.

If a count leading zero (CLZ) operation is indicated on the selection input to the mux 62, the SRCA input is selected through the mux 62 to the detect circuit 42. In this case, the operation of the detect circuit 42 (which is unchanged from its operation in the magnitude circuit) results in detecting the first binary one bit (beginning from the most significant bit) in the SRCA operand. This indication is also indicative of the number of leading zeros, since bits to the left of the first binary one bit (more significant bits than the first binary one bit) are all zero. The encoder 64 receives the one hot vector and encodes a count of leading zeros using the one hot vector to produce the output Out[N−1:0].

If a count leading one (CLO) operation is indicated on the selection input to the mux 62, the mux 62 selects the output of the bitwise invert circuit 60, which performs a bitwise inversion of the SRCA operand. By performing a count leading zero operation on the inversion of the operand, a count leading one operation is accomplished for that operand. Again, the encoder receives the one hot vector and encodes a count of leading ones using the one hot vector to produce the output Out[N−1:0].

In an alternative embodiment, the circuit 44 may be the NAND circuit described above with regard to FIG. 2. In such an embodiment, the bitwise compare circuit 40 performs a bitwise XNOR on the source operands, as described above. Additionally, the mux 62 selects the output of the bitwise invert circuit 60 to perform a count leading zero operation and the SRCA operand to perform a count leading one operation, since the NAND circuit 44 produces zeros in the most significant bits until the first zero is detected in the input. In other words, such an embodiment may perform a count leading one function. Generally, the circuit may count the number of leading bits having a first state, and the count leading zero or count leading one operation may be performed by selecting the appropriate one of the SRCA operand or its inversion to perform the desired function.

It is noted that the number of bits in the Out output (N) may be related to the number of bits of the operand. Since the Out output is a count of the number of leading ones or zeros in the operand, the count is between zero and M. The number of bits used to represent values between zero and M is the $\log_2(M+1)$. For example, if M is 64, N may be 7.

In one embodiment, M may be 64 and the integer unit 22A may also handle instructions defined to operate on a 32 bit operand. In this case, the size32 signal may be asserted to the encoder 64. The encoder 64 may then emit a count of leading zeros/ones within the least significant 32 bits of the operand. For example, the assertion of the size32 signal may force the Out[N] bit to zero. Other embodiments may omit this feature.

While the illustrated embodiment handles CLZ, CLO, and magnitude comparisons, other embodiments may handle only the CLZ and the magnitude comparison or only the CLO and the magnitude comparison. Furthermore, in some embodiments, the encoder 64 and the A_Gt_B circuit 48 may be merged into one circuit which outputs Out[N−1:0], and a bit of the output may be the A_Gt_B signal if the circuit is performing a magnitude comparison (e.g. the least significant bit or the most significant bit of Out[N−1:0]).

It is noted that, while a mux 62 is illustrated in FIG. 5, generally any sort of selection circuit may be used. A selection circuit is a circuit coupled to receive two or more inputs and a selection control, wherein the selection circuit is configured to select one of the inputs as an output responsive to the selection control. A selection circuit may comprise a single mux, multiple muxes in parallel or in series, or any other circuit.

Figure 6:
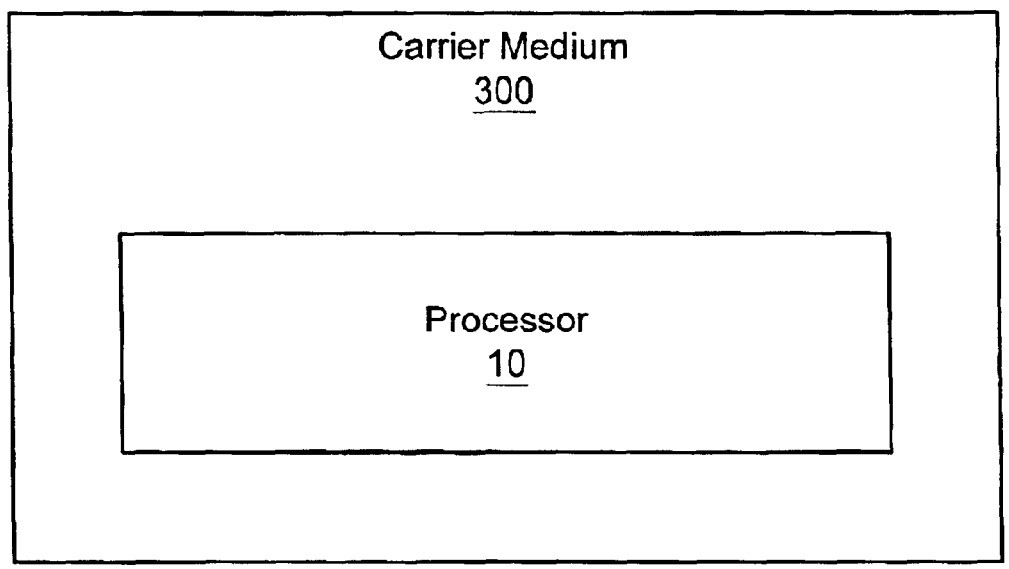
FIG. 6 is a block diagram of one embodiment of a carrier medium.

Turning next to FIG. 6, a block diagram of a carrier medium 300 including one or more data structures representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the data structure(s) of the processor 10 carried on carrier medium 300 may be read by a program and used, directly or indirectly, to fabricate the hardware comprising the processor 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 10. The netlist may then be placed and routed to produce a data set describing geometric shapes to be applied to masks. The masks may then be used in various semiconductor fabrication steps to produce a semiconductor circuit or circuits corresponding to the processor 10. Alternatively, the data structure(s) on carrier medium 300 may be the netlist (with or without the synthesis library) or the data set, as desired.

While carrier medium 300 carries a representation of the processor 10, other embodiments may carry a representation of any portion of processor 10, as desired, including an integer unit or portions thereof, magnitude comparators, combined magnitude comparator/count leading zero circuits, portions of the magnitude comparators including bitwise compare circuits, detect circuits, one hot circuits, A_Gt_B circuits, etc., portions of the combined magnitude comparator/count leading zero circuits including bitwise inverters, encoders, and the magnitude comparator portions, etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first circuit coupled to receive a first operand and a second operand, wherein the first circuit is configured to generate a first vector in response to the first operand and the second operand, and wherein each bit of the first vector is indicative of whether or not the corresponding bits of the first operand and the second operand are equal;
   a second circuit coupled to receive the first vector and configured to generate an indication of a most significant bit in which the first operand and the second operand are not equal in response to the first vector; and
   a third circuit coupled to receive the indication from the second circuit and the first operand, wherein the third circuit is configured to generate an output indicative of whether or not the first operand is greater than the second operand responsive to the indication and the first operand.

2. The apparatus as recited in claim 1 wherein the second circuit comprises a first subcircuit coupled to receive the first vector and generate a second vector, wherein each bit of the second vector is equal to a logical combination of the corresponding bit of the first vector and each more significant bit than the corresponding bit of the first vector.

3. The apparatus as recited in claim 2 wherein the first circuit is configured to perform a bitwise exclusive OR, and wherein the logical combination is a logical OR.

4. The apparatus as recited in claim 2 wherein the first circuit is configured to perform a bitwise exclusive NOR, and wherein the logical combination is a logical NAND.

5. The apparatus as recited in claim 2 wherein the second circuit further comprises a second subcircuit coupled to receive the second vector and generate the indication.

6. The apparatus as recited in claim 5 wherein the third circuit is configured to select the bit indicated by the indication from the first operand as the output.

7. The apparatus as recited in claim 6 wherein the indication is a one hot vector with a set bit corresponding to the most significant bit in which the first operand and the second operand are not equal.

8. The apparatus as recited in claim 7 wherein the third circuit is configured to logically AND each bit of the one hot vector and a corresponding bit of the first operand, and to logically OR a result of the logical ANDs.

9. The apparatus as recited in claim 8 wherein the third circuit is configured to invert a most significant bit of the first vector prior to the logical AND if the operands are signed.

10. A method comprising:
    receiving a first operand and a second operand in a processing unit;
    generating a first vector in response to the first operand and the second operand in the processing unit, wherein each bit of the first vector is indicative of whether or not the corresponding bits of the first operand and the second operand are equal;
    generating in response to the first vector, an indication of a most significant bit in which the first operand and the second operand are not equal;
    generating in response to the indication of the most significant bit and in response to a bit state in the first operand, an output indicative of whether or not the first operand is greater than the second operand; and
    providing the output from the processing unit as a magnitude comparison of the first and second operands.

11. The method as recited in claim 10 wherein the generating the indication of the most significant bit comprises generating a second vector responsive to the first vector, wherein each bit of the second vector is equal to a logical combination of the corresponding bit of the first vector and each more significant bit than the corresponding bit of the first vector.

12. The method as recited in claim 11 wherein the generating the first vector comprises performing a bitwise exclusive OR operation, and wherein the logical combination is a logical OR operation.

13. The method as recited in claim 11 wherein the generating the first vector comprises performing a bitwise exclusive NOR operation, and wherein the logical combination is a logical NAND operation.

14. The method as recited in claim 13 wherein the generating the output comprises selecting the bit state in the first operand as the output.

15. The method as recited in claim 14 wherein the indication of the most significant bit is a one hot vector with a set bit corresponding to the most significant bit in which the first operand and the second operand are not equal.

16. The method as recited in claim 15 wherein the selecting comprises performing logical AND operation of each bit of the one hot vector and a corresponding bit of the first operand; and performing logical OR operation of a result of the logical ANDs operation.

17. The method as recited in claim 16 further comprising inverting a most significant bit of the first vector prior to performing the logical AND operation if the operands are signed.

18. An apparatus comprising:
    a first circuit coupled to receive a first operand and a second operand, wherein the first circuit is configured to generate a first vector in response to the first operand and the second operand, and wherein each bit of the first vector is indicative of whether or not the corresponding bits of the first operand and the second operand are equal;

a selection circuit coupled to receive two or more inputs including the first vector and the first operand, wherein the selection circuit is configured to select one of its inputs as a first output responsive to a selection control;

a second circuit coupled to receive the first output and configured to generate an indication of a most significant bit of the first output which is in a first state;

a third circuit coupled to receive the indication from the second circuit and the first operand, wherein the third circuit is configured to generate a second output indicative of whether or not the first operand is greater than the second operand responsive to the indication and the first operand; and an encoder coupled to receive the indication and configured to generate a third output indicative of a number of leading bits in the first output having a first binary state.

19. The apparatus as recited in claim 18 wherein the selection control is indicative of which of a plurality of operations is to be performed.

20. The apparatus as recited in claim 19 wherein the plurality of operations includes a magnitude compare, and wherein the first vector is selected if the magnitude compare is to be performed.

21. The apparatus as recited in claim 19 wherein the plurality of operations includes a count leading zero operation, and wherein the first operand is selected if the count leading zero operation is to be performed.

22. The apparatus as recited in claim 19 further comprising a bitwise invert circuit coupled to receive the first operand and to provide an inversion of the first operand, the selection circuit coupled to receive the inversion of the first operand as one of the two or more inputs, and wherein the plurality of operations includes a count leading one operation, and wherein the inversion of the first operand is selected if the count leading one operation is to be performed.

23. The apparatus as recited in claim 18 wherein the first binary state is a binary zero.

24. The apparatus as recited in claim 18 wherein the first binary state is a binary one.

* * * * *

UNITED STATES PATENT AND TRADEMARK OFFICE
CERTIFICATE OF CORRECTION

PATENT NO. : 6,907,443 B2 Page 1 of 1
APPLICATION NO. : 09/956399
DATED : June 14, 2005
INVENTOR(S) : Daniel Murray It is certified that error appears in the above-identified patent and that said Letters Patent is hereby corrected as shown below:

Column 12, line 60, in Claim 16: replace "ANDs" with --AND--.

Signed and Sealed this

Sixteenth Day of December, 2008

JON W. DUDAS
*Director of the United States Patent and Trademark Office*